(12) United States Patent
Shah et al.

(10) Patent No.: US 11,354,267 B1
(45) Date of Patent: Jun. 7, 2022

(54) COMPILER FOR A COMMAND-AWARE HARDWARE ARCHITECTURE

(71) Applicant: Lilac Cloud, Inc., Cupertino, CA (US)

(72) Inventors: Jay Shah, Morgan Hill, CA (US); Srikanth Lakshminarasimhan, Bangalore (IN); Simon Luigi Sabato, Saratoga, CA (US); Jui-Yang Lu, Fremont, CA (US)

(73) Assignee: Lilac Cloud, Inc., Cupertino, CA (US)

( * ) Notice: Subject to any disclaimer, the term of this patent is extended or adjusted under 35 U.S.C. 154(b) by 0 days.

(21) Appl. No.: 17/145,662

(22) Filed: Jan. 11, 2021

(51) Int. Cl.
  *G06F 15/82* (2006.01)
  *G06F 8/41* (2018.01)
(52) U.S. Cl.
  CPC ............... *G06F 15/82* (2013.01); *G06F 8/41* (2013.01)
(58) Field of Classification Search
  None
  See application file for complete search history.

(56) References Cited

U.S. PATENT DOCUMENTS

| | | | | |
|---|---|---|---|---|
| 5,732,273 A * | 3/1998 | Srivastava | .......... | G06F 11/3612 717/130 |
| 5,774,728 A * | 6/1998 | Breslau | ..................... | G06F 8/47 717/141 |
| 8,418,155 B2 * | 4/2013 | McAllister | .......... | G06F 9/30036 717/149 |
| 8,468,510 B1 * | 6/2013 | Sundararajan | .......... | G06F 30/34 717/152 |
| 9,563,754 B2 * | 2/2017 | Colnot | ............... | G06Q 20/3227 |
| 10,120,661 B2 * | 11/2018 | Sandberg | ............ | G06F 9/44542 |
| 11,159,404 B1 * | 10/2021 | Kuo | ..................... | H04L 43/0876 |
| 2017/0052830 A1 * | 2/2017 | Gambardella | ............ | G06F 8/65 |

FOREIGN PATENT DOCUMENTS

WO WO-2016116132 A1 * 7/2016 ............. G06F 8/443

\* cited by examiner

*Primary Examiner* — Eric Coleman
(74) *Attorney, Agent, or Firm* — Invoke

(57) ABSTRACT

In an embodiment, a compiler for generating command bundles is configured to receive an execution definition that includes operations for execution. The compiler determines an ordered set of hardware functions corresponding to a hardware architecture to execute at least one operation. The hardware architecture may be selected from typical processor types or a command-aware hardware processor. The compiler generates a command bundle that includes a set of logically independent commands based on hardware functions and functionality of the hardware architecture to optimize execution of the operations. A command-aware hardware processor includes a hardware routing mesh that includes sets of routing nodes that form one or more hardware pipelines. Many hardware pipelines may be included in the hardware routing mesh. A command bundle is transmitted through a selected hardware pipeline via a control path, and is modified by the routing nodes based on execution of commands to achieve a desired outcome.

20 Claims, 8 Drawing Sheets

COMPILER FOR A COMMAND-AWARE HARDWARE ARCHITECTURE

TECHNICAL FIELD

The disclosure generally relates to a compiler for hardware processors, and more particularly to a command-driven programming model for accelerating compute functions performed by one or more hardware processors.

BACKGROUND

In many computer architectures, a central processing unit (CPU) is used as the primary processor for performing and executing instructions from software applications. In these computer architectures, for any given software application, various compute functions provided by the application are implemented on the CPUs and the processing power of the CPU(s) limits the performance of the software application.

However, in some computer architectures, a portion of the application's compute functions may be offloaded from the CPU(s) to other processing devices, such as application specific integrated circuits (ASICs), graphics processing units (GPUs), and field programmable gate arrays (FPGAs). This offloading is intended to free up processing resources on the CPU(s) and to improve performance of the software application.

BRIEF DESCRIPTION OF THE DRAWINGS

Reference symbols in the various drawings that have the same number indicate like elements.

DETAILED DESCRIPTION

Figure 1:
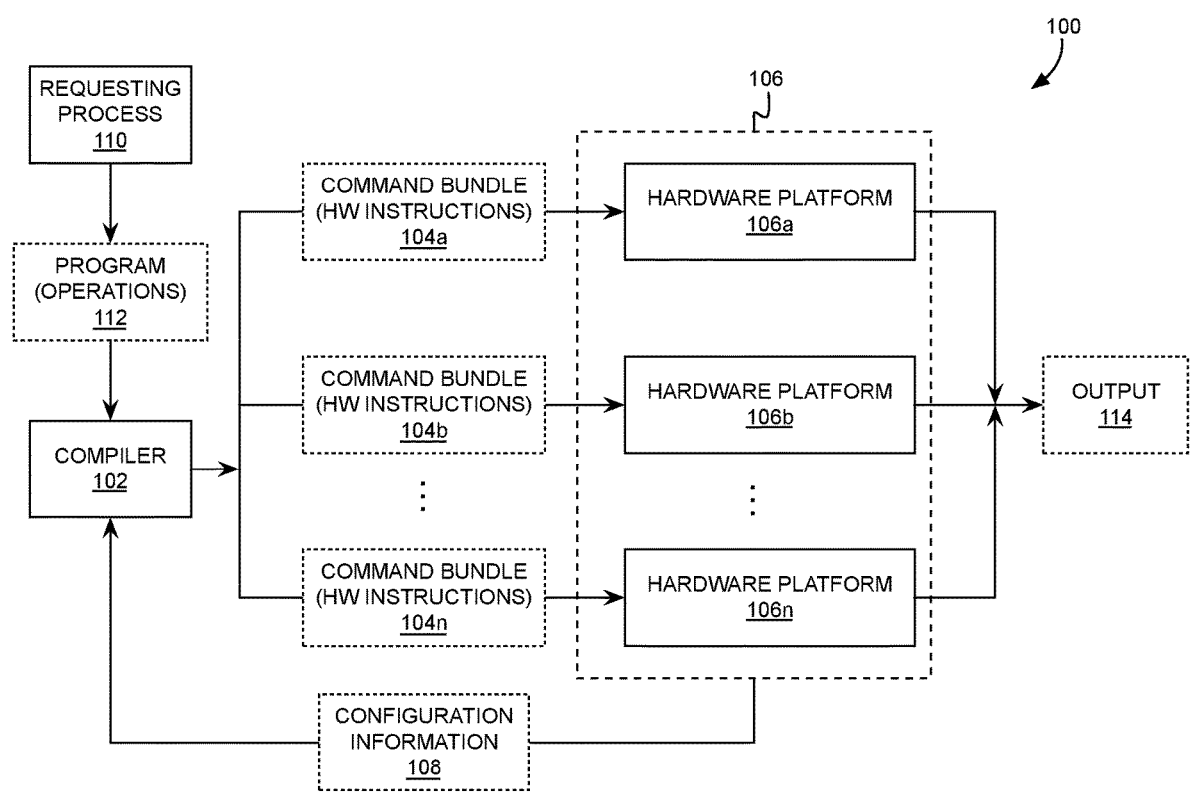
FIG. 1 illustrates an example system for processing commands.

In the following descriptions, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

The descriptions presented herein relay sufficient information to enable a person having ordinary skill in the art to make and use the present invention and are provided in the context and requirements of particular embodiments of the present invention.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms. In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

1. GENERAL OVERVIEW
2. SYSTEM ARCHITECTURE
2.1 SYSTEM FOR COMMAND PROCESSING
2.2 COMMAND-AWARE HARDWARE ARCHITECTURE
3. EXAMPLE EMBODIMENTS
3.1 COMMAND BUNDLES
3.2 METHOD FOR GENERATING A COMMAND BUNDLE
3.3 METHOD FOR GENERATING A COMMAND BUNDLE FOR EXECUTION BY A COMMAND-AWARE HARDWARE ARCHITECTURE
3.4 METHOD FOR MODIFYING A COMMAND BUNDLE
4. MISCELLANEOUS; EXTENSIONS
5. HARDWARE OVERVIEW

1. GENERAL OVERVIEW

One or more embodiments include a compiler for generating command bundles. An execution definition that includes operations is provided to the compiler. The compiler determines an ordered set of hardware functions corresponding to a hardware architecture to execute at least one operation. The hardware architecture may be a field programmable gate array (FPGA), application specific integrated circuit (ASIC), central processing unit (CPU), graphics processing unit (GPU), or command-aware processor. The compiler generates a command bundle to include a set of logically independent commands based on the hardware functions of the hardware architecture to optimize execution of the at least one operation.

A command-aware processor may include a hardware routing mesh that includes sets of routing nodes that form one or more hardware pipelines. Many hardware pipelines may be included in the hardware routing mesh. A command bundle is streamed through a hardware pipeline via a control path. The command bundle is modified by the routing nodes based on execution of commands to achieve a desired outcome.

Each routing node within a hardware pipeline is associated with one or more hardware modules for processing commands. A routing node forwards commands to another routing node in the hardware routing mesh when the command cannot be executed by the associated hardware module(s).

The compiler, in one or more embodiments, selects an order for the set of logically independent commands based on information collected by the compiler. Some example information includes: an order of the hardware functions, command type(s) executable by each of the hardware functions, whether any of the hardware functions require data and/or an argument to execute and where the data and/or argument is attainable, and hardware architecture details, such as support for parallel processing, existence of a recirculation loop, existence of a load balancer, etc.

Moreover, the compiler, in one or more embodiments, selects commands to include in the command bundle from a set of command types based on data collected by the compiler. Some example data includes what type of operation is to be performed, functional capability of the hardware functions, and functional capability of other hardware architectures available to perform operations.

This Specification may include, and the claims may recite, some embodiments beyond those that are described in this General Overview section.

2. SYSTEM ARCHITECTURE

A plurality of software applications may be executing on a computer system at any given time. Each software application provides a plurality of compute functions for execution by a processor of the computer system. For simplicity, it is assumed that a software application's compute functions may be divided into three different classes based on the computer system's architecture and ability to implement the compute functions: CPU-based architecture functions (for CPU implementation), GPU-based architecture functions (for GPU implementation), and hard program-based architecture functions (for ASIC and/or FPGA implementation).

CPUs and GPUs are built using well-defined architectures that are optimized for the class of compute functions they are most commonly expected to execute. This provides a common programming paradigm for software developers to build applications for CPUs and GPUs. A command-aware processor architecture may be used for applications using FPGA-based platforms and/or ASIC-based platforms.

The methodology for how each ASIC-based platform and FPGA-based platform handle specific architectural attributes is unique to each application (e.g., custom for the application it is designed for). For example, each of these platform characteristics may be designed differently for any given ASIC-based platform and FPGA-based platform:

1) Connections to external interfaces, e.g., interfaces to memory, peripheral component interconnect express (PCIe), media access control (MAC), etc.
2) Transport and routing between compute functions
3) Definition of instructions and data to execute compute functions
4) Data coherency checks
5) Data integrity checks
6) Performance optimizations
7) Debugging infrastructure With an ASIC, the underlying design of compute functions, along with the definition and placement of the compute functions is predetermined and fixed. Therefore, these aspects of a typical ASIC cannot be reprogrammed or changed after manufacturing the ASIC. On the other hand, an FPGA may be reprogrammed after manufacture. However, every time a change is enacted to an existing compute function, and every time a new compute function is added, the underlying FPGA design is changed to accommodate these modified or added compute functions. This means that changes to typical ASIC-based platforms and FPGA-based platforms are expensive, e.g., they take time, have great complexity, and require tedious effort. Ultimately, these changes may lead to variability in performance and stability of the platform.

An FPGA is a platform that is capable of being reprogrammed to create and combine custom accelerated compute functions that may be modified over and over again. In that sense, it is unlike a CPU, GPU, or ASIC whose architecture is designed and fixed by the vendor. FPGA compute functions may be developed independently by different independent developers, as opposed to a few large companies in the case of CPUs and GPUs, and put together in flexible ways to provide offloaded processing capacity for a range of applications.

The command-aware processor architecture provides for a common architecture for ASIC-based platforms and FPGA-based platforms that software developers are able to utilize to build applications. Although for FPGA implementations it may be difficult to arbitrarily combine compute modules developed by different developers within the same organization and installations, and nearly impossible across different organizations, the command-aware processor architecture overcomes these difficulties through implementation of a compiler that operates as a common interface for producing hardware platform-specific command bundles for execution by the various hardware platforms.

2.1. System for Command Processing

FIG. 1 illustrates an example system 100 for processing commands in accordance with one or more embodiments. System 100 may be optimized for compute functions that are most commonly offloaded to any particular hardware platform, e.g., ASIC, FPGA, CPU, GPU, and/or command-aware processor. System 100 includes a compiler 102 and at least one hardware platform 106 (e.g., hardware platform 106a, hardware platform 106b, . . . , hardware platform 106n).

In one or more embodiments, system 100 may include more or fewer components than the components illustrated in FIG. 1. The components illustrated in FIG. 1 may be local to or remote from each other. The components illustrated in FIG. 1 may be implemented in hardware with or without the aid of software-defined rules. Each component may be used to accelerate multiple applications. Multiple components may be used to accelerate any single application. Operations described with respect to one component may instead be performed by another component.

Moreover, system 100 may be leveraged in a common architecture for use by any accelerated application executing on a computer system. System 100 may also respond to a common programming paradigm used by software developers to program the system 100 to perform desired compute functions (similar to CPUs and GPUs).

Compiler 102 utilizes a command-driven programming model for accelerating operations requested by a requesting process 110 (e.g., an application, operating system service, firmware function, etc.) to optimize performance of system 100. The command-driven programming model allows requesting processes 110 to describe a high-level intent in the form of a program 112 which includes a set of operations to be performed. Compiler 102 creates at least one command bundle 104 (which includes at least one set of hardware instructions) based on program 112 and aspects of available hardware platforms 106 for executing command bundle(s) 104. After a command bundle 104 is executed by a hardware platform 106 selected by compiler 102 for execution of the command bundle 104, an output 114 from the execution is passed back to the requesting process 110.

Each command bundle 104 is an "executable" that encodes all or some of the operations the requesting process 110 wants executed, in an accelerated manner, on one of the hardware platforms 106. A command bundle 104 is a compact, generic, hardware-independent format that may be used to describe any program 112 to be executed on hardware accelerators.

Compiler 102 is configured to receive operations (in a program 112) to be performed by at least one of the hardware platforms 106. This program 112 may be sent from a requesting process 110, received in a command bundle definition, generated by a component of system 100, or otherwise acquired by compiler 102.

The requesting process 110 may be included in system 100, in one approach. In an alternate approach, requesting process 110 is not included in system 100, but is configured to send and/or receive information via a communication channel with system 100. Example information for exchange includes, but is not limited to, a program 112, command bundles 104, output 114, etc.

Each command in a command bundle 104 is a logically independent and atomic operation. Each command is potentially complex in that it may require multiple discrete functions to be performed to execute the command. Each command also clearly defines a set of inputs (data and arguments, which may be null) and a set of outputs (which may simple or complex, e.g., a flag, 0 or 1, an argument, a value or set of values, a function, etc.).

A command bundle 104 is transmitted to a single hardware platform 106 for execution thereof. Accordingly, each command in a command bundle 104 is executed on a single hardware entity. That single hardware entity may be the entirety of a hardware platform 106 in one approach. In another approach, that single hardware entity may be a single hardware module in a command-aware hardware processor. Multiple commands in a command bundle 104 may be executed on the same hardware entity, one command at a time.

In some approaches, a command bundle (e.g., command bundle 104b) may be specific to a particular hardware platform (e.g., hardware platform 106b) in order for the particular hardware platform 106b to understand the commands in the command bundle 104b and provide an output 114 upon execution of the various commands. This approach is useful when the particular hardware platform 106b is of a type that requires commands to be presented in a specific format (e.g., a CPU, a GPU, etc.).

Compiler 102 is configured to determine, learn, acquire, and/or obtain configuration information 108 related to the various hardware platforms 106. The compiler 102 may use the configuration information 108 to determine how to construct a command bundle 104, how many command bundles 104 to generate from a single program 112, which commands to include in a command bundle 104, etc. All of these considerations are made by compiler 102 in order to accomplish the program 112.

This configuration information 108 may include in a non-limiting embodiment, for each respective hardware platform 106 (e.g., hardware platform 106a): identification of an ordered set of hardware functions (e.g., modules for executing commands) included in the hardware platform 106a, an order of the hardware functions included in the hardware platform 106a, one or more command types executable by each of the hardware functions, data and argument requirements of the hardware functions, a determination of support for parallel processing (whether the hardware platform 106a comprises a parallel path, e.g., a path which allows for parallel processing of the command bundle 104a), a determination of whether the hardware platform 106a comprises a load balancer (e.g., a device which determines which of one or more parallel paths to utilize to process one or more portions of the command bundle 104a), and a determination of whether the hardware platform 106a comprises a recirculation loop (e.g., a loop which returns back to the start of the hardware platform 106a once a command bundle has been passed through the ordered set of hardware functions of the hardware platform 106a and still contains one or more unprocessed commands.

In one embodiment, compiler 102 may be configured to generate at least one command bundle 104 for execution by a selected hardware platform 106 (e.g., hardware instructions 104a are generated for execution by hardware platform 106a, hardware instructions 104b are generated for execution by hardware platform 106b, . . . , hardware instructions 104n are generated for execution by hardware platform 106n). In this embodiment, the command bundle 104 may be formatted specifically to be compatible with the selected hardware platform 106. However, in some approaches, the command bundle 104 may be hardware platform-agnostic and transmitted to the particular hardware platform 104 for execution, even when other hardware platforms may be available and capable of executing the command bundle 104.

Compiler 102 may select which hardware platform 106 to send the command bundle 104 based on minimum hardware functionality needed to execute at least one operation of the command bundle 104, and functionality corresponding respectively to each of the hardware platforms 106. Other information may also be used to select a hardware platform 106, such as current availability (i.e., whether the hardware platform currently executing a different command bundle), whether another hardware platform is configured to execute program 112 using less hardware functionality (e.g., it is more efficient), etc.

For example, a command bundle 104 may be used to describe a program 112 where outputs from one command become inputs for another command. In this case, the program 112 may influence the order for execution of commands in the command bundle 104. This example command bundle defines "serial" execution of each command therein in order to achieve a desired result upon execution of the command bundle.

In another example, a command bundle 104 may be used to describe a program 112 where each command acts independently on data provided as an input to the command and generates one or more independent outputs. This example command bundle defines "parallel" execution of each command therein, as the order of execution of the commands is not determinative of the result achieved upon execution of the command bundle.

In another embodiment, compiler 102 may be configured to generate at least one command bundle 104 for execution by any of the available hardware platforms 106 (e.g., hardware instructions 104a are generated for execution by any hardware platform 106a, 106b, . . . , 106n) and a currently available hardware platform may execute the command bundle 104 on a random basis, on a rotating pattern or schedule, or according to some other configuration as indicated by the compiler 102 or some other component of system 100.

In an approach, compiler 102 may receive a command bundle definition from requesting process 110. In other words, program 112 may include a command bundle definition. In this approach, compiler 102 may modify the command bundle definition to generate a command bundle (e.g., command bundle 104b) prior to sending command bundle 104b to a selected hardware platform (e.g., hardware platform 106b). The modification may include setting an order for the set of logically independent commands within the command bundle 104b based on configuration information 108 corresponding to hardware platform 106b.

In one embodiment, compiler 102 may select commands to include in the command bundle 104 from a set of command types. The set of command types may include any type of command that may be executed by one of the hardware platforms 106. Example command types include, but are not limited to, decrypt, encrypt, fetch, store, compress, decompress, etc.

In a further embodiment, the type of commands to include in any particular command bundle 104 may be based on at least one operation (from program 112) to be performed by the hardware platform (e.g., hardware platform 106b), functionality corresponding to an ordered set of hardware functions of hardware platform 106b, and functionality of one or more additional hardware platforms (e.g., hardware platform 106a, . . . 106n) available to perform the at least one operation of program 112.

Compiler 102 may include a request for acknowledgement of execution of a particular command within a command bundle 104. Once the particular command is executed by the selected hardware platform 106 to which compiler 102 sent the command bundle 104, the selected hardware platform 106 (or a component therein, such as hardware functionality which executed the particular command) will send an acknowledgment that the particular command has been executed back to compiler 102 (or some other component of system 100). In this way, it may be guaranteed that the command bundle is being executed as anticipated, based on receiving one or more acknowledgement messages during execution of the command bundle 104.

According to an embodiment, compiler 102 may generate a first command bundle having a first set of commands therein, and a dependent command bundle having a second set of commands therein. The first command bundle may be sent to a particular selected hardware platform (e.g., hardware platform 106a). The dependent command bundle may be sent to the same hardware platform 106a, or a different hardware platform (e.g., hardware platform 106b) for execution after completion of executing the first command bundle. In other words, execution of the dependent command bundle (on hardware platform 106b) is contingent upon execution of the command bundle by hardware platform 106a. In this way, coherency of the command bundles may be guaranteed, as the dependent command bundle will only be executed if the first command bundle is successfully executed. This is useful for situations where, for example, the dependent command bundle relies on an output from execution of the first command bundle.

According to a further embodiment, compiler 102 (or some other component of system 100) may monitor execution of the first command bundle (e.g., command bundle 104a) by its selected hardware platform (e.g., hardware platform 106a). Compiler 102 (or other component of system 100) is configured to determine that execution of the first command bundle 104a is complete via this monitoring. In response to determining that execution of the first command bundle 104a is complete, the dependent command bundle is transmitted to hardware platform 106b for execution thereof.

According to another embodiment, a load balancer (not shown) may determine which hardware platform 106 to send individual commands of a command bundle 104 for parallel execution by the different hardware platforms 106 concurrently or at nearly the same time. In this embodiment, the different hardware platforms 106 may be configured to execute the same type of command or similar command types, e.g., decrypt/encrypt, fetch/store, compress/decompress, etc.

After compiler 102 generates a command bundle 104 and transmits the command bundle 104 to a selected hardware platform 106, the hardware platform 106 executes the command bundle 104 to produce an output 114. System 100 may send the output 114 to one or more components. In one approach, output 114 is provided to the requesting process 110. In another approach, output 114 may be provided to a data path for use in executing additional commands and/or additional command bundles. According to another approach, output 114 may be stored to a data repository (not shown). Any of these operations may be performed by compiler 102, or some other component of system 100.

Transmission of data through the data path may occur asynchronously to advancement of a command bundle 104 through a hardware platform 106. Moreover, compiler 102, in one or more embodiments, may control transmission and advancement of a command bundle 104 through a hardware platform 106 independently from progression of data through the data path. Moreover, compiler 102 may control transmission and advancement of data through the data path independent to the advancement of one or more command bundles 104 through respective hardware platforms 106.

In one or more embodiments, a data repository may be used to store information for system 100, and may be any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or may execute on the same computing system as system 100. Alternatively or additionally, a data repository may be implemented or executed on a computing system separate from system 100.

Also, a data repository may be communicatively coupled to any device for transmission and receipt of data via a direct connection or via a network.

2.2 Command-Aware Hardware Architecture

Figure 2:
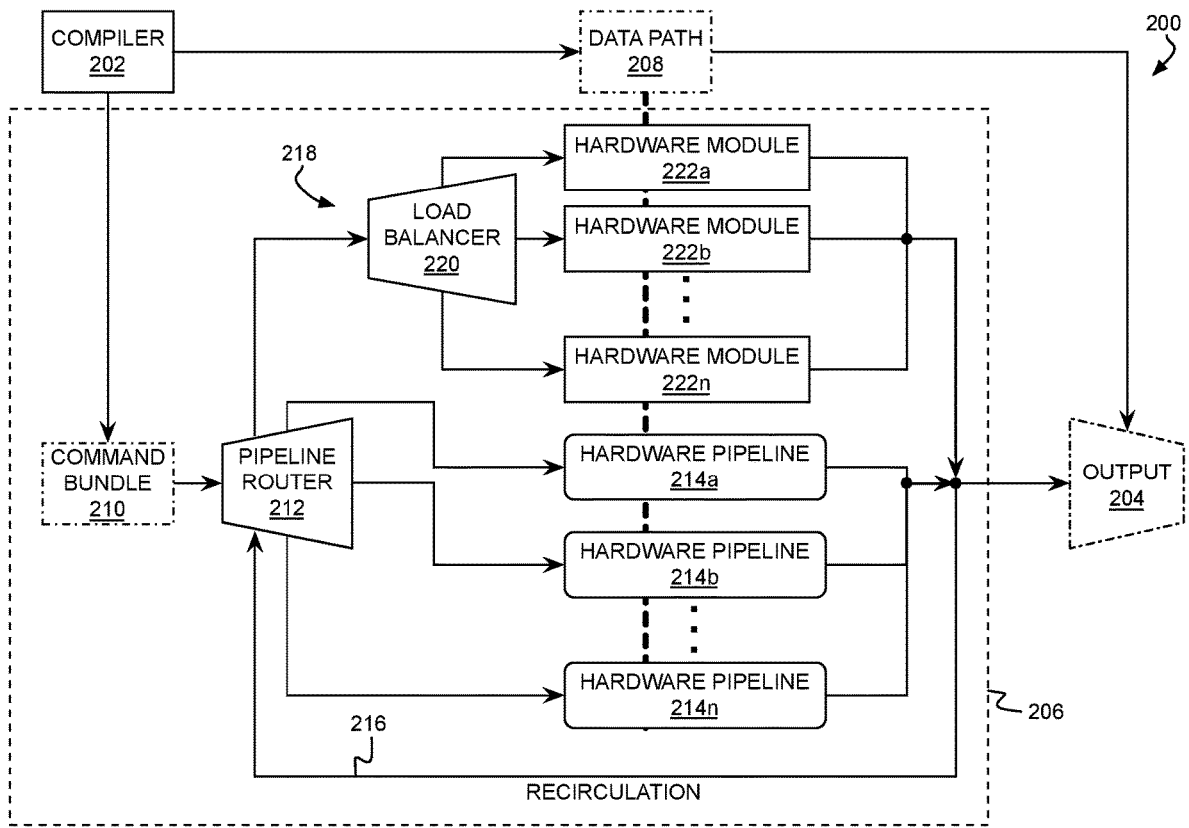
FIG. 2 shows a block diagram of an example command-aware hardware architecture.

FIG. 2 shows a block diagram of an example command-aware hardware architecture 200 in accordance with one or more embodiments. Command-aware hardware architecture 200 includes a compiler 202 and one or more hardware pipelines 214 for processing commands of the command bundle 210 to produce an output 204. In one or more embodiments, command-aware hardware architecture 200 may include a pipeline router 212 coupled to the hardware pipelines 214 and/or a load balancer 220 coupled to a plurality of hardware modules 222. An output 204 is produced once commands of the command bundle 210 have been executed, and may include data from the control path 206 and/or the data path 208, in various approaches.

Compiler 202 may be implemented in hardware, software, or a combination of hardware and software. Compiler 202 is configured to determine which portions of the program include commands for processing that are packaged into the command bundle 210, and which portions of the program include data (e.g., user data, metadata, parameters, parameter values, etc.) which may be used to process the various commands in the command bundle 210. The data stream is sent along the data path 208 separate from the command bundle 210 which is sent along the control path 206.

According to one embodiment, multiple compilers 202 may be included in a single system, with each compiler 202 being coupled to its own control path 206 and data path 206. In this way, the plurality of compilers 202 may select to process a particular program (in lieu of deferring for another compiler to process the program) based on a number of factors, including but not limited to, the availability of hardware pipeline(s), commands to be processed in the program, arrangement of the hardware pipeline(s), etc.

Once command bundle 210 is generated by compiler 202, it is provided to the control path 206. In an embodiment, a pipeline router 212 receives command bundle 210 prior to forwarding command bundle 210 to a selected hardware pipeline 214 (e.g., hardware pipeline 214b). Pipeline router 212 is implemented in hardware in one embodiment. In an approach, pipeline router 212 may be implemented in hardware with configuration changes possible via software. According to another approach, pipeline router 212 may be implemented in software.

Pipeline router 212 is configured to determine which hardware pipeline 214 from a group of hardware pipelines (e.g., hardware pipeline 214a, hardware pipeline 214b, . . . , hardware pipeline 214n) is best suited for processing commands in command bundle 210. Each hardware pipeline 214 comprises an ordered series of modules (not shown) for processing commands. Each module includes a routing node coupled to one or more associated hardware modules for processing commands of a certain type, with any number of modules being possible in any particular hardware pipeline 214 (limited only by constraints on hardware architecture: physical space and layout, and a desired minimum time to traverse a hardware pipeline).

Pipeline router 212 may utilize the individual arrangements of each hardware pipeline 214 (which types of commands may be processed by components of the pipeline), knowledge of which hardware pipelines 214 are available for processing additional commands at any given time, which type of commands are included in command bundle 210, and an order of the commands in command bundle 210 to determine which hardware pipeline 214 to send a particular command bundle 210. The choice of which hardware pipeline 214 to use for a particular command bundle 210 may also be used in choosing which hardware pipeline 214 to use for a next received command bundle 210 in an approach. In an approach, command bundle 210 may be split into multiple portions by pipeline router 212, with the portions being transmitted to different hardware pipelines 214 (e.g., a first portion to hardware pipeline 214a, a second portion to hardware pipeline 214b), in an approach.

According to an embodiment, pipeline router 212 (or some other suitable component of command-aware hardware architecture 200) may selectively provide individual commands of command bundle 210 to different hardware pipelines 214 and/or routing nodes within specific hardware pipelines 214 to allow for parallel execution by different hardware modules associated with the different routing nodes concurrently or at nearly the same time (e.g., based on slight differences in when the commands are actually received by the different hardware modules).

In one embodiment, the routing nodes (and thus associated hardware modules for processing commands of certain types) within each particular hardware pipeline 214 are arranged in a particular order. In this embodiment, pipeline router 212 is configured to select a particular hardware pipeline (e.g., hardware pipeline 214a instead of any of the other hardware pipelines 214b, . . . , 214n) to transmit command bundle 210 based on one or more criteria. The criteria includes, but is not limited to, an order of commands in command bundle 210, command types of commands in command bundle 210, metadata in command bundle 210 and/or in data path 208, and availability of individual hardware pipelines 214 for processing commands. Once pipeline router 212 selects the particular hardware pipeline (e.g., hardware pipeline 214a), command bundle 210 is transmitted to the selected hardware pipeline 214a.

In an alternate embodiment, command-aware hardware architecture 200 may include a single hardware pipeline 214 comprising an ordered series of modules, each module including a routing node coupled to one or more associated hardware modules for processing commands of a certain type. In this embodiment, no pipeline router 212 would be used. However, the compiler 202 would still split the program into components for control path 206 and data path 208, as described previously.

In an embodiment, a hardware pipeline (e.g., hardware pipeline 214b) may include one or more storage devices (such as buffers, memories, registers, etc.). The storage device(s) are configured to store data for use by a routing node and/or hardware module within hardware pipeline 214b. According to one embodiment, each set of routing node/hardware module(s) includes at least one storage device for use in processing commands of command bundle 210.

In an embodiment, control path 206 may include a recirculation loop 216 which allows for a command bundle 210 or portion thereof to be sent back to pipeline router 212 and/or a hardware pipeline 214 for continued processing after having been passed through one or more selected hardware pipeline(s) (e.g., hardware pipeline 214b). In this embodiment, pipeline router 212 may be configured to perform additional tasks after transmitting command bundle 210 to the selected hardware pipeline 214b. For example, pipeline router 212 may be configured to determine whether at least one command in command bundle 210 has not been executed by a hardware module of the selected hardware pipeline 214b. Also, responsive to determining that the at least one command in command bundle 210 has not been executed after being returned along recirculation loop 216, all of command bundle 210, or commands remaining therein, may again be transmitted to one or more hardware pipeline(s) 214. The same hardware pipeline 214b may be used in one embodiment. In another embodiment, one or more different hardware pipelines (e.g., hardware pipeline 214a) may be used for continued processing of command bundle 210, in conjunction with the originally selected hardware pipeline 214b or exclusive of this hardware pipeline 214b.

Upon receiving command bundle 210 at pipeline router 212 from recirculation loop 216, pipeline router 212 (or some other component of command-aware hardware architecture 200) may determine a number of times that command bundle 210, or a portion thereof, has been transmitted through control path 206 (e.g., a selected hardware pipeline 214). In response to determining that at least one command in command bundle 210 has not been executed, and the number of times that command bundle 210 has been sent through control path 206 exceeds a configurable threshold (e.g., 2 times, 2 times, 5 times, 10 times, etc.), pipeline router 212 may generate an error indicating that processing of command bundle 210 has failed in an embodiment.

In an embodiment, compiler 202 may be configured to generate acknowledgements (indicating execution of a certain command or execution of an entire command bundle, as desired) from one or more of the hardware pipelines 214, and/or one or more of the hardware modules 222, based on acknowledgment requests placed in a generated command bundle 210 and/or associated with a certain command bundle 210.

According to one embodiment, compiler 202 may provide services for system 200 and components thereof. For example, compiler 202 may provide an acknowledgement service, which indicates when a command or an entire command bundle has been executed (through command bundle acknowledgements and individual command acknowledgements). In another example, compiler 202 may provide a coherency service, which ensures that shared resources are singularly accessed by multiple commands in one or more command bundles. According to another example, compiler 202 may provide a scheduling service, which ensures that commands in one or more command bundles are executed in a desired order. In additional examples, compiler 202 may provide security services, data integrity services, reliability services, etc.

In one embodiment, pipeline router 212 (or some other component of command-aware hardware architecture 200) is configured to determine an amount of time that has elapsed since command bundle 210 was transmitted through control path 206 (e.g., a selected hardware pipeline) for a first time. In response to determining that at least one command in command bundle 210 has not been executed after receiving command bundle 210 from recirculation loop 216, and that the elapsed amount of time exceeds a configurable duration threshold (e.g., 100 microseconds, 10 milliseconds, 1 second, 10 seconds, 20 seconds, etc.—the total amount of time allowed for a command bundle to complete processing including recirculation attempts), pipeline router 212 may generate an error indicating that processing of command bundle 210 has failed in an embodiment. This approach is helpful to ensure that a command bundle 210 that may never complete processing is not repeatedly sent back through control path 206. Command bundle 210 may never complete processing due to some unforeseen issue with command bundle 210, arrangement of the hardware pipeline(s) 214, problems with information or data in data path 208, etc.

In an approach, pipeline router 212 (or some other component of command-aware hardware architecture 200) is configured to determine an amount of time that has elapsed since command bundle 210 was transmitted through control path 206 (e.g., a selected hardware pipeline). In response to determining that the elapsed amount of time exceeds a configurable passthrough threshold, pipeline router 212 may re-transmit command bundle 210 back through the selected hardware pipeline or along another hardware pipeline 214. This approach is helpful to ensure that a command bundle 210 does not get "stuck" or slowed-down in a hardware pipeline and never or only very slowly complete processing, due to some unforeseen issue with command bundle 210, arrangement of the hardware pipeline(s) 214, problems with information or data in data path 208, etc.

In one example, each of the hardware modules associated with the routing nodes in a particular hardware pipeline 214 may be configured to execute a same command type (e.g., all hardware modules in hardware pipeline 214b may process fetch and/or store commands). Moreover, pipeline router 212 may be configured to perform load balancing across each the plurality of hardware modules associated with the plurality of routing nodes in hardware pipeline 214b. Load balancing ensures that different command bundles 210 and/or individual commands within command bundles 210 are load-balanced across the particular hardware modules in hardware pipeline 214b to more efficiently utilize the fetch command processing of hardware pipeline 214b.

In some approaches, a load balancer 220 may be positioned upstream from a plurality of hardware modules (e.g., hardware module 222a, hardware module 222b, ... hardware module 222n) in a single hardware pipeline 218. Load balancer 220 may distribute command bundle 210 across one or more of the hardware modules 222 downstream of load balancer 220 according to availability and/or other factors associated with teach of the hardware modules 222 (e.g., hardware module 222a, hardware module 22b, ... hardware module 222n).

An output 214 is produced once commands of a command bundle 210 have been executed, and may include data from control path 206 and/or data path 208, in various approaches. A recirculation loop 216 is provided for recycling command bundle 210 back to pipeline router 212 or a first routing node of a hardware pipeline 214 (or the load balancer 220 in some implementations) for processing by the various hardware modules 222 one or more additional times. Recirculation loop 216 may be used when at least one command remains in the command bundle 210 after being passed through the various hardware modules 222.

In one implementation, load balancer 220 may be integrated into pipeline router 212. In other words, pipeline router 212 may be configured to perform load balancing across the plurality of hardware modules 222 communicatively coupled thereto. Load balancing may account for any number of factors or aspects. These factors or aspects may be related to any of the hardware modules 222, command bundle 210, an order of commands within command bundle 210, the type of commands within command bundle 210, a number of recirculations performed and/or allowed, etc.

Some hardware modules 222 are configured to execute more than one command type. However, the multiple command types that are able to be executed typically are related in some way, such as encrypt and decrypt, fetch and store, compress and decompress, etc. In this way, hardware modules 222 may execute different command types, but the command types are related (e.g., similar commands).

For load balancer 220, each hardware module 222 (e.g., hardware module 222a, hardware module 222b, hardware module 222n, etc.) is configured to execute the same or similar commands, and load balancer 220 has knowledge of the specific command(s) executable by the plurality of hardware modules 222. Command bundle 210 is received by load balancer 220, which determines which commands in command bundle 210 are executable by the various hardware modules 222. These selected commands are distributed across the plurality of hardware modules 222 to be executed in parallel. In this way, multiple commands may be executed concurrently or at nearly the same time (based on slight differences in when the commands are actually received by the different hardware modules 222).

Each hardware pipeline 214 may include multiple routing nodes. Each routing node is associated with a respective hardware module and is connected to its respective hardware module for transmission of data/information between the routing node and hardware module.

A routing node is a hardware device configured to receive a command bundle 210 via a control path 206. Control path 206 connects each of the routing nodes in a hardware pipeline 214.

According to one approach, a plurality of routing nodes may be arranged in a particular order within a hardware pipeline 214 in accordance with software-defined rules. A composer application associated with command-aware hardware architecture 200 may adhere to the software-defined rules in choosing and/or selecting how to arrange individual routing nodes within a particular hardware pipeline 214. The software-defined rules may include rules for managing the number of routing nodes (and associated at least one hardware module), rules for positioning routing nodes within a hardware pipeline 214, rules associated with load-balancing and hardware pipeline routing, etc.

The rules for positioning routing nodes may include, but are not limited to, which types of routing nodes (dictated by a type of command that a hardware module associated with a routing node is configured to process) may or must be positioned next to one another, which types of routing nodes may or must be positioned before another type of routing node, which types of routing nodes may be positioned after another type of routing node, etc.), how many of the same type of routing nodes may be positioned in series, etc.

The rules for managing the number of routing nodes may include, but are not limited to, a total number of routing nodes in a particular hardware pipeline 214, a minimum number of routing nodes in any hardware pipeline 214, a number of routing nodes that may be repeated in series, etc.

The rules associated with load-balancing for the load balancer 220 may include, but are not limited to, distributing processing loads according to a scheme or metric across multiple hardware pipelines, and distributing loads across hardware modules which execute the same or similar command type within a single hardware pipeline. When distributing processing loads across multiple hardware pipelines, a load-balancer may ensure that each hardware pipeline is utilized in accordance with the scheme or metric over a certain period of time, avoiding busy or unavailable hardware pipelines when selecting which hardware pipeline to send a command bundle, etc. When distributing loads across hardware modules which execute the same or similar command type, a load-balancer may ensure that each hardware module is utilized approximately equally, that loads are directed to available hardware modules, that loads are directed with knowledge of ordering concerns within the command bundle, etc.

Each routing node of a command-aware hardware architecture 200 is configured to receive a command bundle 210 (or a portion thereof). The command bundle 210 is modified based on execution of the logically independent commands as the command bundle 210 is streamed through the plurality of routing nodes in the command-aware hardware architecture 200. Responsive to determining that (a) a first command of the logically independent commands is not of a particular command type associated with at least one hardware module communicatively coupled to the routing node, or (b) at least one argument used for executing the first command is not received in association with the first command: the routing node is configured to transmit the first command to a next routing node of the plurality of routing nodes. Also, each routing node is configured to receive a second command of the command bundle 210 and responsive to determining that (a) the second command of the logically independent commands is of the particular command type associated with the at least one hardware module communicatively coupled to the routing node, and (b) arguments used by the second command are received in association with the second command, the routing node is configured to transmit the second command to the at least one hardware module communicatively coupled to the routing node for execution. Moreover, each routing node is configured to modify the command bundle 210 based on execution of completed commands by refraining from transmitting the executed command of the command bundle 210 to a next routing node of the plurality of routing nodes.

According to one approach, command bundle 210 may be modified through one or more actions, with the possible actions being wide-ranging. For example, command bundle 210 may be modified by refraining from transmitting a second command of command bundle 210 to a next routing node in the order of connection of control path 206.

Other forms of modification of command bundle 210 are possible, such as deletion or removal of commands, modification of commands, inclusion of one or more arguments within command bundle 210 (e.g., as command data), inclusion of an implicit or explicit indicator (marker, note, pointer, flag, etc.) within command bundle 210 denoting execution of a command, storing a result of executing a command in a dataset (e.g., on the data path 208) associated with command bundle 210, storing an implicit or explicit indicator for the result in command bundle 210, addition of a data command in place of a command in command bundle 210, addition of data with respect to command bundle 210, generating a new command bundle that includes no commands (a null bundle), etc.

A data command, as used herein, refers to a command that may be added to a command bundle which refers to a location (e.g., a FPGA memory address, CPU memory address, GPU memory address, etc.) to access a result of executing a command from the command bundle.

3. EXAMPLE EMBODIMENTS

Detailed examples are described below for purposes of clarity. Components and/or operations described below should be understood as specific examples which may not be applicable to certain embodiments. Accordingly, components and/or operations described below should not be construed as limiting the scope of any of the claims.

3.1 Command Bundles

Figure 3A:
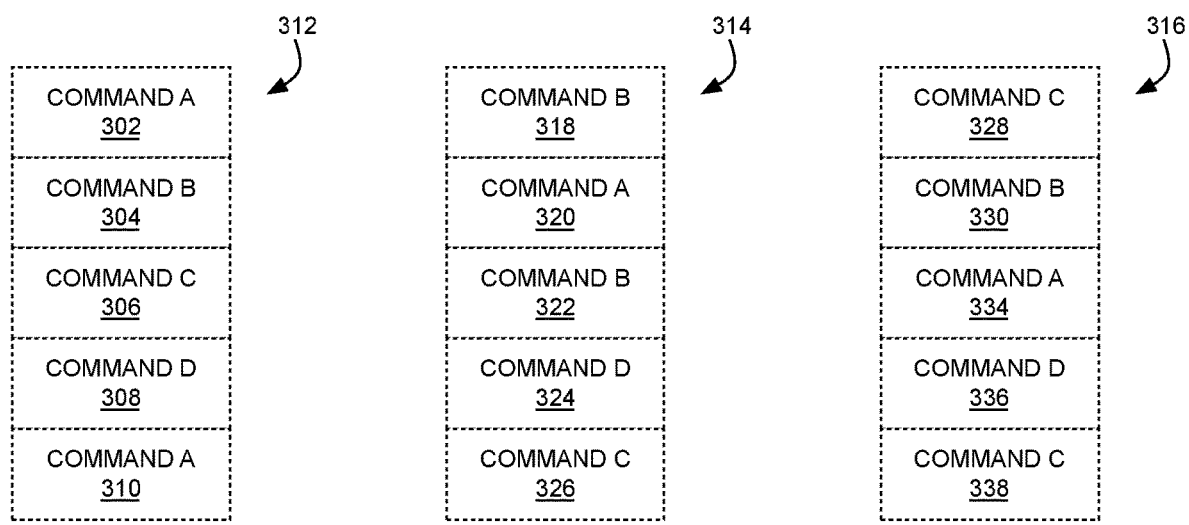
FIG. 3A shows three example command bundles that each include an ordered set of commands.

FIG. 3A shows three example command bundles 312, 314, 316 that each include an ordered set of commands. These example command bundles may be used with a command-aware hardware platform or some other hardware platform. However, there is less information available for construction or generation of the command bundles when using other hardware platforms. Any number of commands may be included in any single command bundle, and the order of the commands within the particular command bundles may be selected and/or determined using an application configured for optimizing the order of commands in a particular command bundle based on the arrangement of hardware modules in a particular pipeline, architecture, and/or system. In one approach, the compiler may execute this application for generating command bundles for execution of a program provided thereto.

There are many aspects to consider when generating an arrangement of hardware modules in a particular system. Some of these aspects include, but are not limited to, a total number of hardware modules the particular system, a type of command associated with each hardware module, a number of hardware modules associated with the same type of command, the presence of load balancers, interfaces configured to choose from among several different pipelines (collection of routing nodes and associated hardware modules), number of recirculations allowed, etc. Any of these aspects may contribute to execution paths through a command-aware hardware architecture, in various approaches.

The compiler may reconfigure individual commands included in a command bundle along with an order for the included commands, in order to achieve a desired outcome from processing the command bundle using one or more particular processing architectures or individual hardware pipelines in a particular architecture. Moreover, each command comprises instructions or functions that are to be executed and/or processed by a hardware module, and each instruction or function may reference, utilize, and/or generate one or more arguments, parameters, outcomes, or values. Moreover, some of the commands may be dependent on another command, such as relying on an output of the command on which it is dependent.

Referring again to FIG. 3A, as shown in example command bundle 312, Command A 302 is positioned first, followed by Command B 304, Command C 306, Command D 308, and Command A 310. Command bundle 312 is an example of how four command types: A, B, C, D, may be arranged together in a five command bundle. In this example command bundle Command A is repeated twice.

Example command bundle 314 begins with Command B 318, followed by Command A 320, Command B 322, Command D 324, and Command C 326. Command bundle 314 is another example of four command types arranged together in a five command bundle, with Command B repeated twice.

Example command bundle 316 includes Command C 328, followed by Command B 330, Command A 334, Command D 336, and Command C 338. Command bundle 316 is another example of four command types arranged together in a five command bundle, with Command C repeated twice.

In these example command bundles, a caveat is required, in that execution of Command A is dependent on execution of Command B, while execution of Command D is dependent on execution of Command C. Therefore, in the following descriptions of executing these example bundles using example execution paths, Command A cannot be executed until Command B has been executed. Likewise, Command D cannot be executed until Command C is executed.

Figure 3B:
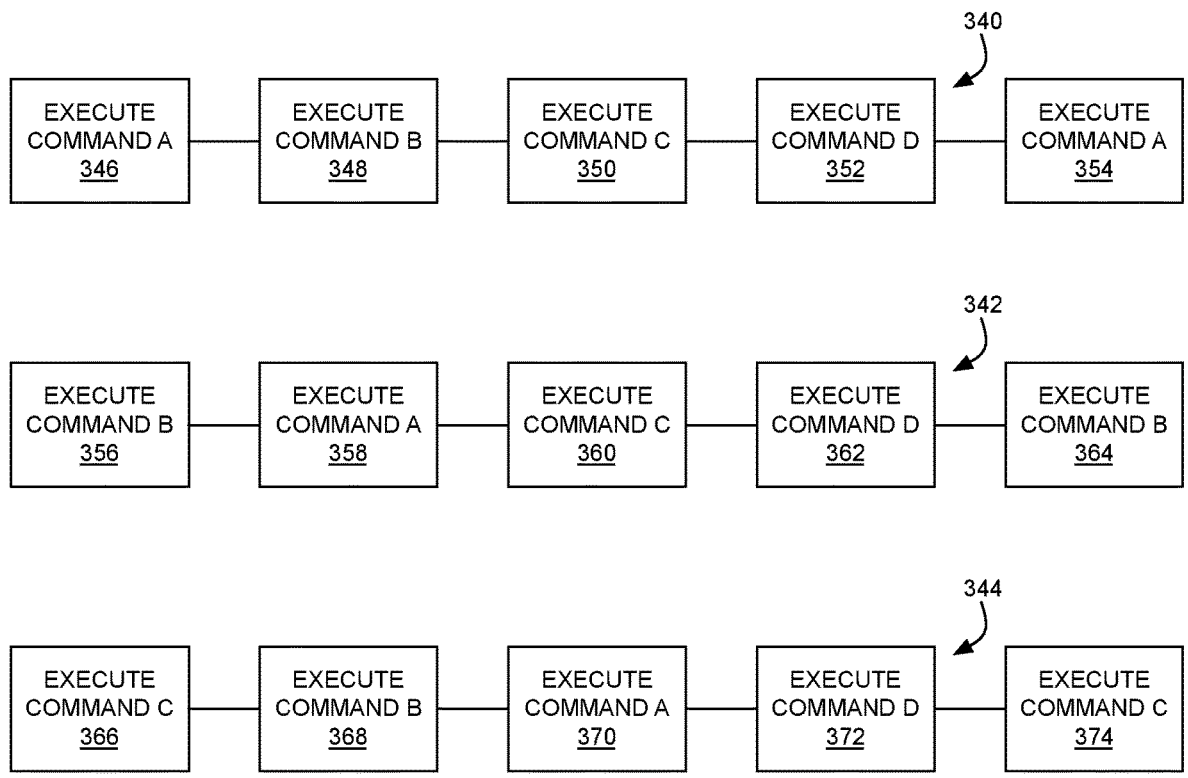
FIG. 3B shows example paths through a processing architecture for executing command bundles.

FIG. 3B shows example execution paths or pipelines for a command-aware hardware architecture. Each execution path 340, 342, 344 includes a series of hardware modules configured to execute one or more command types. In each of these example paths 340, 342, 344, for simplicity, each hardware module is shown as executing a single command type, but other implementations or not so limited, as some hardware modules may execute more than one command type, e.g., fetch/store, encrypt/decrypt, etc. The architecture of the execution paths 340, 342, 344 are simplified as a series of modules in this diagram. However, each individual module comprises a routing node that is coupled to one or more hardware modules configured to process the specific command type shown for the module in one embodiment. For each execution path 340, 342, 344, each module, once it receives a command bundle, will traverse the command bundle until it reaches a command that it is configured to process. The module will process the command (if possible) and pass on the command bundle to the next module. The command bundle may be modified to indicate processing of a command in some instances. For the sake of these descriptions, once a module processes a command, the command will be removed from the command bundle.

Path 340 includes hardware modules arranged to execute commands in the following ordered series: Command A 346-Command B 348-Command C 350-Command D 352-Command A 354. Path 342 includes hardware modules arranged to execute commands in the following ordered series: Command B 356-Command A 358-Command C 360-Command D 362-Command B 364. Path 344 includes hardware modules arranged to execute commands in the following ordered series: Command C 366-Command B 368-Command A 370-Command D 372-Command C 374.

In one example, assume that command bundle 312 is provided to path 340. The result of passing command bundle 312 through path 340 in a first pass-through is that module 346 cannot execute Command A 302 (because Command B 304 has not executed) and passes the command bundle to the next module 348, module 348 executes Command B 304, module 350 executes Command C 306, module 352 executes Command D 308 (based on execution of Command C 306 by the previous module), and module 354 executes Command A 310 (based on executing Command B 304 by module 348). After the first pass-through, command bundle 312 will be reduced to Command A 302, e.g., A. A second pass-through of the remaining command A in the partial command bundle results in Command A 302 not being executed, because it is dependent on execution on Command B, and there are no additional results available from execution of a Command B. Thus, command bundle 316 will not complete executing when provided to path 340 no matter how many times it is attempted due to the construction of the command bundle and which commands are included therein. A similar result occurs when command bundle 316 is provided to paths 314 and 316, because there are too many commands of type Command A included in the bundle (or conversely not enough command types Command B), thereby violating the dependency of the commands.

In another example, assume that command bundle 314 is provided to path 340. The result of passing command bundle 314 through path 340 in a first pass-through is that module 346 cannot execute a command (because Command B 318 has not been executed) so it passes the bundle to the next module, module 348 executes Command B 318, module 350 traverses command bundle 314 to find and execute Command C 326, module 352 executes Command D 324 (based on execution of Command C 326), and module 354 executes Command A 320 (based on execution of Command B 318 by module 348). After the first pass-through, command bundle 314 will be reduced to Command B 322, e.g., B. A second pass-through of the remaining command B in the partial command bundle results in execution of Command B 322 by module 348, completing the execution of command bundle 314 after two pass-throughs. However, if the execution path 340 was arranged differently to include two modules configured to execute Command B, the command bundle 314 could have been processed completely in a single pass-through.

According to an example, assume that command bundle 316 is provided to path 340. The result of passing command bundle 316 through path 340 in a first pass-through is that module 346 cannot execute a command (because Command B 330 has not been executed) so it passes the bundle to the next module, module 348 executes Command B 330, module 350 executes Command C 328, module 352 executes Command D 336 (based on execution of Command C 328 by the previous module), and module 354 executes Command A 334 (based on execution of Command B 330 by module 348), and passes the remaining command bundle. After the first pass-through, command bundle 316 will be reduced to Command C 338, e.g., C. A second pass-through of the remaining command C 338 in the partial command bundle results in completing the execution of command bundle 316 after two pass-throughs. However, if the execution path 340 was arranged differently to include two modules configured to execute Command C, command bundle 316 could have been processed completely in a single pass-through.

Continuing with this example, assume that command bundle 314 is provided to path 342. The result of passing command bundle 314 through path 342 in a first pass-through is that module 356 executes Command B 318, module 358 executes Command A 320 (based on execution of Command B 318), module 360 traverses command bundle 314 to find and execute Command C 326, module 362 executes Command D 324 (based on execution of Command C 326), and module 364 executes Command B 322. Therefore, path 342 processes command bundle 314 completely in a single pass-through. The types of commands and order of commands in command bundle 314, and modules for processing commands in path 342 are configured in a way that allows for single-pass processing and reduces processing resources for this combination of command bundle 314 and path 342.

According to another example, assume that command bundle 316 is provided to path 342. The result of passing command bundle 316 through path 342 in a first pass-through is that module 356 executes Command B 330, module 358 executes Command A 334 (based on execution of Command B 330 by the previous module), module 360 executes Command C 328, module 362 executes Command D 336 (based on execution of Command C 328 by the previous module), and module 364 cannot execute a command (because Command B 330 has already been executed and no further Command B are present in command bundle 316) so it passes the remaining command bundle. After the first pass-through, command bundle 316 will be reduced to Command C 338, e.g., C. A second pass-through of the remaining command C 338 in the partial command bundle results in completing the execution of command bundle 316 after two pass-throughs. However, if the execution path 342 was arranged differently to include two modules configured to execute Command C, command bundle 316 could have been processed completely in a single pass-through.

In an example, assume that command bundle 314 is provided to path 344. The result of passing command bundle 314 through path 344 in a first pass-through is that module 366 traverses command bundle 314 to find and execute Command C 326, module 368 executes Command B 318, module 370 executes Command A 320 (based on execution of Command B 318 by the previous module), module 372 executes Command D 324 (based on execution of Command C 326 by module 366), and module 374 does not execute a command and passes the remaining command bundle. After the first pass-through, command bundle 314 will be reduced to Command B 322, e.g., B. A second pass-through of the remaining command B 322 in the partial command bundle results in completing the execution of command bundle 314 after two pass-throughs. However, if execution path 344 was arranged differently to include two modules configured to execute Command B, command bundle 314 could have been processed completely in a single pass-through.

According to another example, assume that command bundle 316 is provided to path 344. The result of passing command bundle 316 through path 344 in a first pass-through is that module 366 executes Command C 328, module 368 executes Command B 330, module 370 executes Command A 334 (based on execution of Command B 330 by the previous module), module 372 executes Command D 336 (based on execution of Command C 328 by module 366), and module 374 execute Command C 338. Therefore, path 344 processes command bundle 316 completely in a single pass-through. The types of commands and order of commands in command bundle 316, and modules for processing commands in path 344 are configured in a way that allows for single-pass processing and reduces processing resources for this combination of command bundle 316 and path 344.

The compiler is configured to take into account types of commands that are executable by different modules in a hardware pipeline, and an order of the different modules, in order to generate a command bundle that will be executed with minimal or a reduced amount of processing resources compared to executing a different command bundle on the same available hardware architecture(s), including limiting the number of recirculations (or pass-throughs) that are needed, in various approaches, as described in the previous examples. Moreover, the compiler may determine which specific hardware platforms are available at any given time in generating a command bundle, thereby ensuring that the command types selected for a command bundle, the order of the commands in the command bundle, and the modules of the selected hardware platform align to completely process the command bundle in a fewest number of passes possible.

3.2 Method for Generating a Command Bundle

Figure 4:
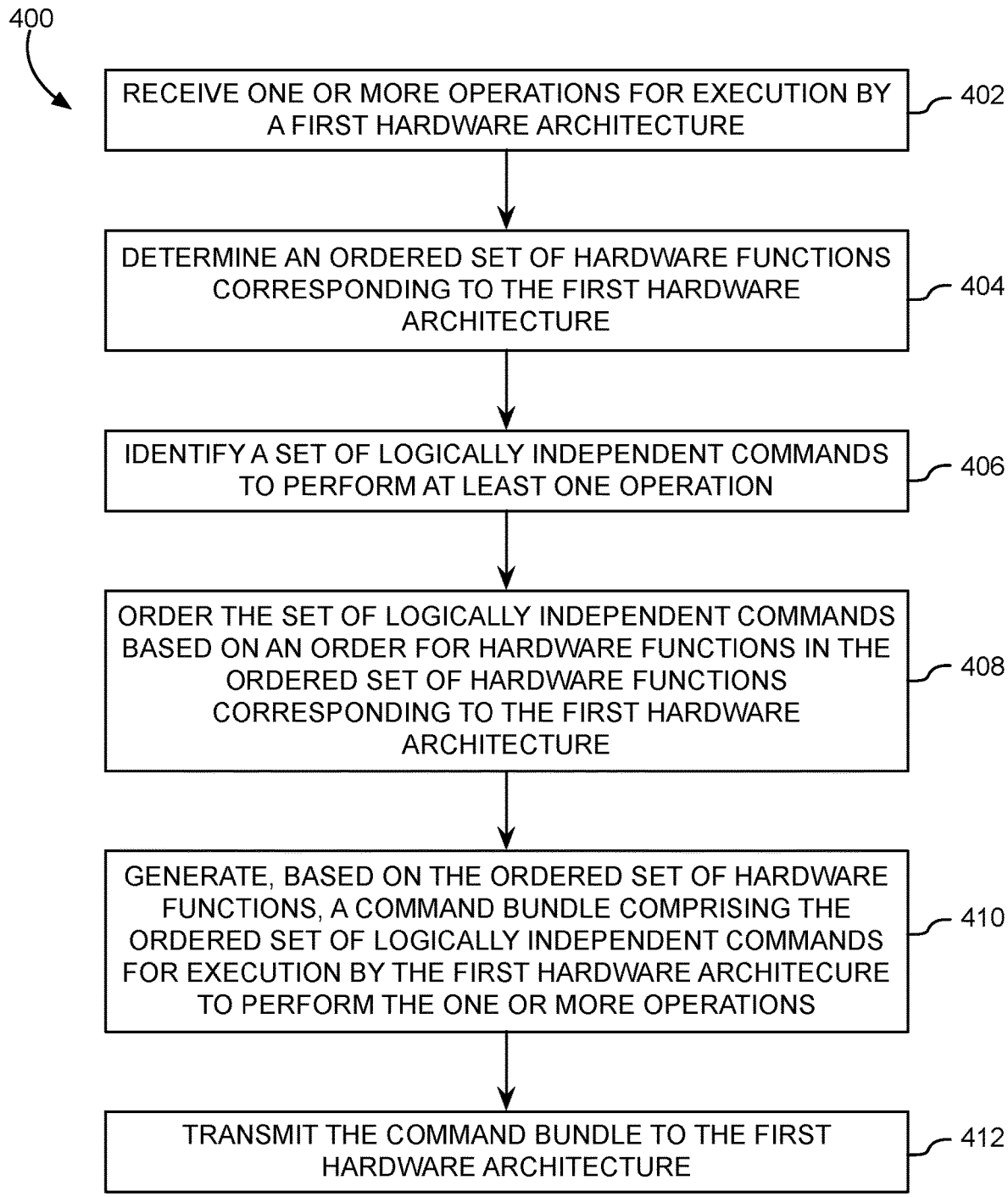
FIG. 4 is a flow diagram of an example method for generating a command bundle.

FIG. 4 is a flow diagram of an example method 400 for generating a command bundle in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments. In one embodiment, a compiler may perform method 400 to provide a command bundle to one or more hardware platforms or architectures for execution thereof.

In addition, method 400 may be implemented using a command-aware hardware architecture that includes a plurality of routing nodes. Each routing node is associated with one or more hardware modules. Each hardware module is configured to process a certain type of command dependent on the individual hardware module (e.g., different command types may be processed by the different hardware modules in the command-aware hardware architecture).

In operation 402, the compiler receives one or more operations (which may be included in a program or execution definition). The operations may be received in a single package, as a stream of information, from a previously-generated or incomplete command bundle, etc. Moreover, in an approach, the operations may indicate a first hardware architecture that should be used to perform at least one of the operations.

In operation 404, based on the operations, the compiler determines an ordered set of hardware functions (or hardware modules) corresponding to the first hardware architecture to execute at least one operation of the one or more operations.

Each hardware function is a discrete capability of the first hardware architecture, and may be included in metadata or configuration information corresponding to the first hardware architecture. Moreover, the order of the various hardware functions of the first hardware architecture is also determined by the compiler, and may be included in the metadata or configuration information.

In operation 406, the compiler identifies a set of logically independent commands to perform at least one operation of the one or more operations. The compiler may select the commands from amongst a set of commands available for performing certain predetermined functions.

For example, if one of the operations requests adding a constant (c) to a variable (x), with the variable being passed and the constant stored to memory, the commands may include, in order: check if x is available, fetch c from memory, add x+c, store result to memory.

In one embodiment, the compiler selects which commands to include in the command bundle from a set of different types of commands (e.g., predetermined types of commands that are able to be processed by various modules of the hardware architectures). The selection of which commands to include in the command bundle may be based on the operation(s) to be performed by the first hardware architecture, functionality corresponding to the ordered set of hardware functions within the first hardware architecture, and/or capability/functionality of one or more additional hardware architectures available to perform the at least one operation.

In operation 408, the compiler selects an order for the set of logically independent commands based on an order for hardware functions in the ordered set of hardware functions corresponding to the first hardware architecture.

In further embodiments, the compiler may use any of the following information, alone or in combination with one another, to select the order for the set of logically independent commands: one or more command types executable by each of the hardware functions in the ordered set of hardware functions, data and argument requirements of the hardware functions in the ordered set of hardware functions, a determination of whether the first hardware architecture supports parallel processing and comprises a parallel path or multiple parallel paths (and which command types are executable along each parallel path), a determination of whether the first hardware architecture comprises a load balancer (and which hardware functions are load balanced), and a determination of whether the first hardware architecture comprises a recirculation loop (to allow for unexecuted commands to be sent back through the ordered set of hardware functions in one or more subsequent pass-throughs).

In operation 410, the compiler generates, based on the ordered set of hardware functions, a command bundle. The command bundle includes the ordered set of logically independent commands (which may include argument or data dependency due to their discrete functionality, as described previously) for execution by the first hardware architecture. The command bundle is generated to ensure that at least one selected operation from the one or more received operations is performed successfully by the first hardware architecture.

In operation 412, the compiler transmits the command bundle to the first hardware architecture. In an alternate or complimentary embodiment, the compiler may store the command bundle for use at an appropriate future time (or for repeated use).

According to an approach, the compiler may modify the command bundle to include an indicator (e.g., pointer, link, marker, flag, etc.) that may be set to denote execution of a command by the first hardware architecture upon execution thereof. The indicator may be placed anywhere in the command bundle, such as in metadata associated with the command bundle, in a position where an associated command is positioned, at an end or beginning of the command bundle, etc.

In another approach, the command bundle may include a dataset to store a result of executing a command, with the dataset being associated with the associated command. Initially, this dataset may be null, or may include initial data for use in performing one or more commands of the command bundle. The dataset may be stored to a data path, in the command bundle, and/or in a memory device associated with the first hardware architecture.

The result may be an outcome, argument, parameter, value, or some other data that results from execution or processing of a command. For example, if the command is a fetch command, the result may be the data that the command causes to be fetched from memory.

In another approach, the command bundle may include an indicator for denoting where a result is located. The indicator (e.g., pointer, link, marker, flag, etc.) may directly or indirectly point to a location where a result is or will be stored once a corresponding command is executed to create the result.

Each command bundle includes an ordered set of commands, with each command provided instructions and/or functions to be processed and/or executed. In some instances, a command may also include or make reference to one or more arguments, parameters, and/or values that are used to process/execute the command. The command bundle is streamed through individual modules or hardware functions of the first hardware architecture, which may be a command-aware hardware architecture, or provided to a different processing architecture (e.g., FPGA, ASIC, etc.). Moreover, as commands in the command bundle are processed and/or executed, the command bundle is modified based on such execution of commands.

Figure 5:
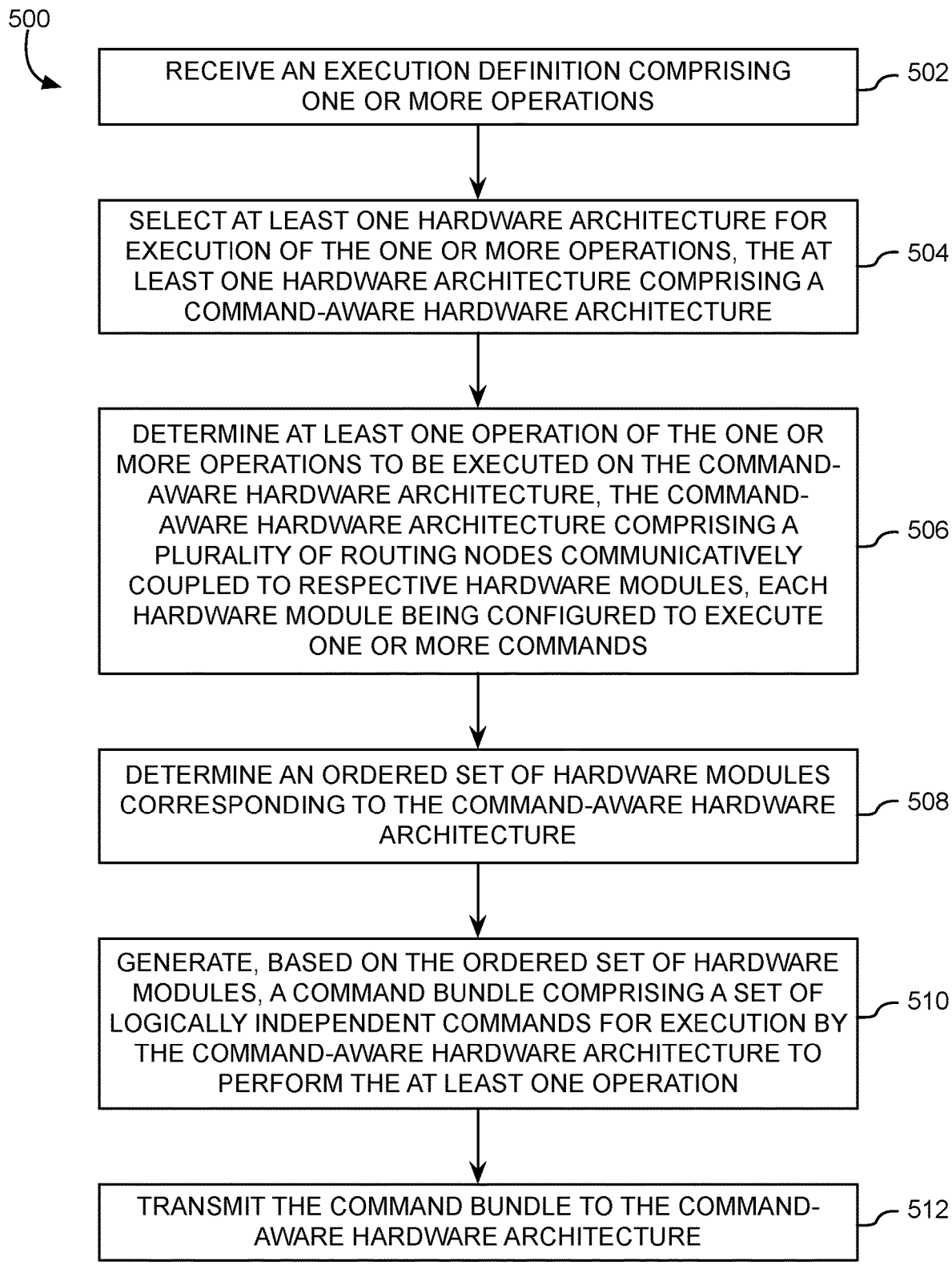
FIG. 5 is a flow diagram of an example method for generating a command bundle for execution by a command-aware hardware architecture.

3.3 Method for Generating a Command Bundle for Execution by a Command-Aware Hardware Architecture FIG. 5 is a flow diagram of an example method for generating a command bundle for execution by a command-aware hardware architecture in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments. In one embodiment, a compiler may perform method 500 to provide a command bundle to one or more hardware platforms or architectures for execution thereof.

In addition, method 500 may be implemented using a command-aware hardware architecture that includes a plurality of routing nodes. Each routing node is associated with one or more hardware modules. Each hardware module is configured to process a certain type of command dependent on the individual hardware module (e.g., different command types may be processed by the different hardware modules in the command-aware hardware architecture).

In operation 502, the compiler receives an execution definition. The execution definition, such as a program, includes one or more operations. The execution definition may be received in a single package, as a stream of information, from a previously-generated or incomplete command bundle, etc.

In operation 504, the compiler selects at least one hardware architecture, from amongst a group of hardware architectures, for execution of the operations defined in the execution definition. In one embodiment, the selected hardware architecture includes a command-aware hardware architecture, as described previously.

In other approaches, the group of hardware architectures may include types of hardware architectures that are not command-aware, such as CPUs, GPUs, ASICs, etc.

In one embodiment, the group of hardware architectures may be included in a distributed computing environment (also sometimes referred to as a "cluster"), where different types of hardware architectures exist in different computing systems. The different computing systems are connected and/or accessible, at least to the compiler, to allow the compiler to generate command bundles and forward such command bundles for execution. Each computing system may have one type of hardware architecture (e.g., a CPU, a GPU, etc.), a plurality of a single hardware architecture (e.g., multiple FPGAs, multiple GPUs, etc.), or various different hardware architectures within the same computing system (e.g., FPGAs and ASICs, a CPU and FPGAs, etc.). One or more networks may be used to interconnect the various computing systems, and/or to connect the compiler to the various computing systems in the distributed computing environment. The execution of various command bundles may be coordinated across the different computing systems, in an approach. In an alternate approach, execution of various command bundles may be independently performed by each computing system across the different computing systems in the distributed computing environment.

The command-aware hardware architecture includes a plurality of routing nodes communicatively coupled to respective hardware modules. Each hardware module is configured to execute at least one command type.

In various approaches, the compiler considers a number of factors to select the hardware architecture. The factors may include, but are not limited to, minimum hardware functionality needed to execute the operations, availability of the various hardware architectures (e.g., the selected hardware architecture is available to process commands), capability/functionality corresponding respectively to each of the plurality of hardware architectures including the command-aware hardware architecture, processing efficiency of the command-aware hardware architecture in light of the operations to be executed, etc.

In operation 506, the compiler determines at least one operation that will be executed on the selected command-aware hardware architecture. Because multiple operations may be included in the execution definition, and the compiler may generate multiple command bundles for executing different portions of the execution definition, one or more operations are selected from all possible operations included in the execution definition, based on the selection of the command-aware hardware architecture.

In operation 508, the compiler determines an ordered set of hardware functions corresponding to the command-aware hardware architecture. In other words, the compiler determines the order of function execution and capability/functionality for the command-aware hardware architecture.

In an example, the compiler may determine one or more of the following aspects of the command-aware hardware architecture: a number of hardware modules in the command-aware hardware architecture, one or more types of commands each hardware module is configured to execute, an order of the hardware modules in the command-aware hardware architecture, whether the command-aware hardware architecture supports parallel processing, and/or whether the command-aware hardware architecture supports recirculation of commands.

In operation 510, the compiler generates, based on the ordered set of hardware modules, a command bundle. The command bundle includes a set of logically independent commands (which may include argument or data dependency due to their discrete functionality, as described previously) for execution by the command-aware hardware architecture. The command bundle is generated to ensure that at least one selected operation from the set of operations is performed successfully by the command-aware hardware architecture.

In one embodiment, the compiler selects which commands to include in the command bundle from a set of different types of commands (e.g., predetermined types of commands that are able to be processed by the command-aware hardware architecture). The selection of which commands to include in the command bundle may be based on the operation(s) to be performed by the command-aware hardware architecture, functionality corresponding to the ordered set of hardware functions within the command-aware hardware architecture, and/or capability/functionality of one or more additional hardware architectures available to perform the at least one operation (such that a particular command may be added to a different command bundle for execution by another hardware architecture).

According to an embodiment, the compiler selects an order for the set of logically independent commands based on any of the following information, alone or in combination with one another: an order of the hardware functions in the ordered set of hardware modules, one or more command types executable by each of the hardware modules in the ordered set of hardware modules, data and argument requirements of the hardware modules in the ordered set of hardware modules, a determination of whether the command-aware hardware architecture supports parallel processing and comprises a parallel path or multiple parallel paths (and which command types are executable along each parallel path), a determination of whether the command-aware hardware architecture comprises a load balancer (and which hardware modules and/or hardware pipelines are load balanced), and a determination of whether the command-aware hardware architecture comprises a recirculation loop (to allow for unexecuted commands to be sent back through the ordered set of hardware modules in one or more subsequent pass-throughs).

In a further approach, the compiler may consider secondary parameters when selecting which commands to include in the command bundle, an order of the selected commands, and/or which hardware architecture will be used to execute the generated command bundle. These secondary parameters include, but are not limited to, an amount of resources used upon execution of the command bundle or portions thereof, an amount of heat generated upon execution of the command bundle or portions thereof, an amount of energy consumed during execution of the command bundle or portions thereof, cost analysis for the system executing the command bundle or portions thereof, and an amount of time needed to execute the command bundle or portions thereof.

In this approach, the compiler may attempt to reduce use and consumption of these resources, or balance their use and consumption against other factors, in generating the command bundle and selecting one or more hardware architectures for executing the command bundle.

In one embodiment, the compiler is configured to generate the command bundle to include a request for acknowledgement of execution of at least one particular command of the set of logically independent commands. This is referred to as "Command Bundle Acknowledgement," and is possible when processing command bundles with a command-aware hardware architecture. Any of the commands within a command bundle may include and/or be associated with a request for acknowledgement of execution. Upon execution of a command which requests for acknowledgement, a hardware module which executed the command (or a routing node coupled to the hardware module) sends an acknowledgement back to the compiler, another component of a command-aware hardware architecture, or the requesting process.

According to an embodiment, the compiler is configured to ensure coherency of execution of commands within at least one command bundle, by monitoring command execution and delaying command execution, when needed, to ensure that commands are executed in a desired order or only one at a time, across one or more hardware architectures. For example, if command bundle A is sent to hardware architecture A and command bundle B is sent to hardware architecture B, and the compiler is directed to maintain coherency between certain commands (e.g., the fourth command of command bundle A and the sixth command of command bundle B), then the compiler will not transmit or promote the fourth command of command bundle A if it determines that the sixth command of command bundle B is currently being executed. Likewise, the compiler will not transmit or promote the sixth command of command bundle B if it determines that the fourth command of command bundle A is currently being executed. This may be accomplished with command acknowledgements in the command bundles, in an approach, or by monitoring execution status for each command in another approach. Coherency between commands is useful in ensuring that a shared resource is available for use by multiple commands in the same or different command bundles.

According to another embodiment, the compiler is configured to ensure coherency of execution of different command bundles. For example, if command bundle A must complete execution prior to command bundle B, then the compiler will not transmit or promote command bundle B until it determines that all commands of command bundle A have been executed. This may be accomplished with command bundle acknowledgements at the end of the command bundles, in an approach, or by monitoring execution status for each command bundle in another approach.

In a further embodiment, the compiler is configured to generate a dependent command bundle (whose execution is dependent upon execution of a previously-generated command bundle). The dependent command bundle is generated to include a second set of commands for execution by the selected command-aware hardware architecture or a different command-aware hardware architecture. In this embodiment, execution of the dependent command bundle is contingent upon execution of the previously-generated command bundle by the selected command-aware hardware architecture. The compiler will transmit the dependent command bundle to the selected command-aware hardware architecture or the different command-aware hardware architecture for execution once it is generated. This is referred to as "Command Bundle Coherency" and is used to ensure that commands are executed in a desired or required order by restricting execution of the second set of commands in the dependent command bundle until after execution of the first set of commands in the previously-generated command bundle.

In this embodiment, the compiler is configured to monitor execution of the command bundle by the command-aware hardware architecture, and to determine when execution of the command bundle is complete. Once execution of the command bundle is complete, the dependent command bundle is transmitted to the command-aware hardware architecture or a different command-aware hardware architecture. This is referred to as "Command Bundle Scheduling."

In operation 512, the compiler transmits the command bundle to the command-aware hardware architecture. In an alternate or complimentary embodiment, the compiler may store the command bundle for use at an appropriate future time (or for repeated use).

In a further embodiment, method 500 may include the compiler selecting a second hardware architecture from the plurality of hardware architectures to perform a second operation of the one or more operations. In this embodiment, the plurality of hardware architectures may include any of a FPGA, an ASIC, a GPU, a CPU, etc. Method 500 may also include the compiler determining a second set of hardware functions corresponding to the second hardware architecture, generating, based on the second set of hardware functions, a second command bundle that includes a second set of logically independent commands for execution by the second hardware architecture to perform the second operation. In this embodiment, the second command bundle is formatted to be compatible with the second hardware architecture. The compiler, in this embodiment, also transmits the second command bundle to the second hardware architecture for execution thereof.

3.4 Method for Modifying a Command Bundle

Figure 6:
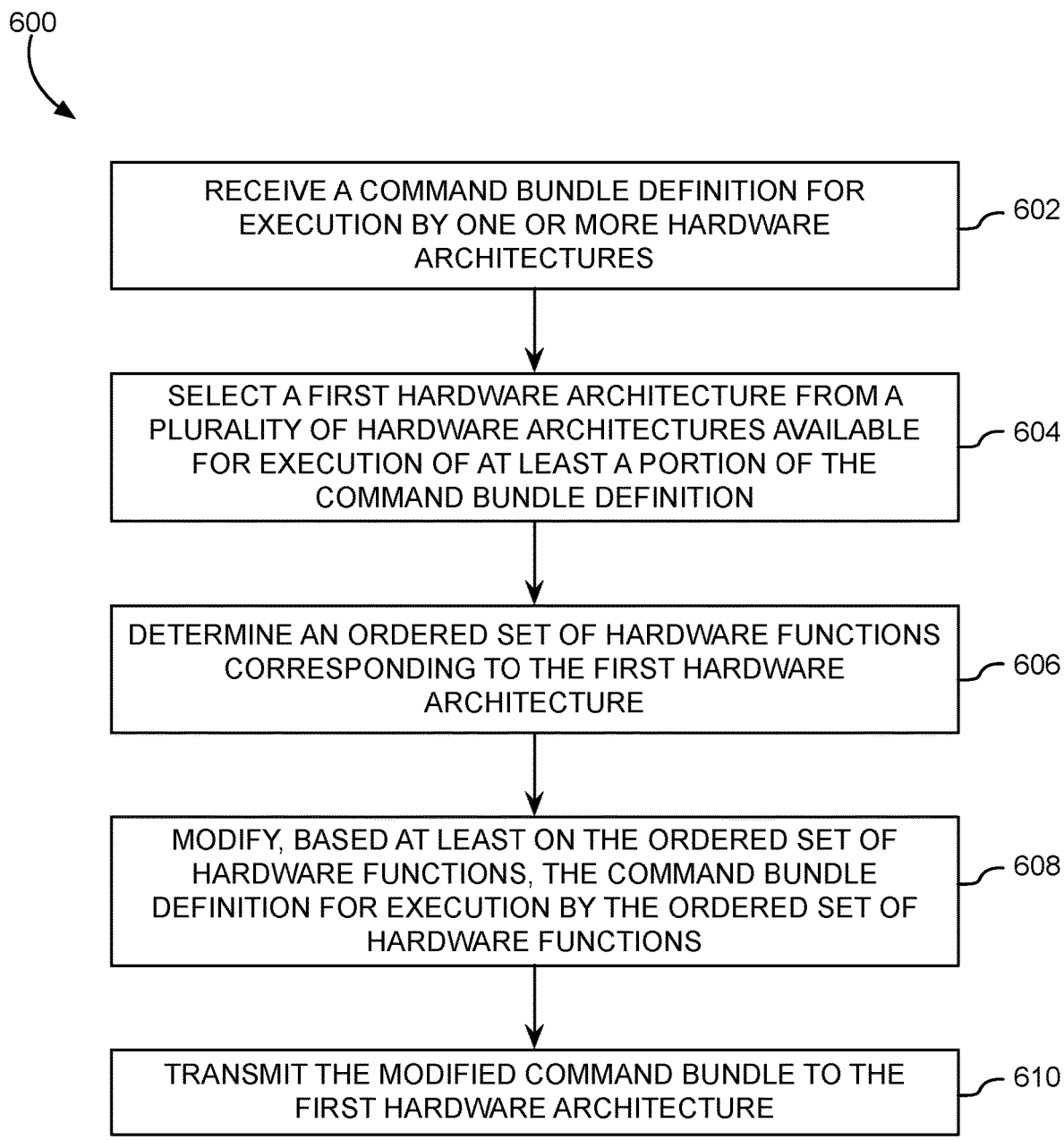
FIG. 6 is a flow diagram of an example method for modifying a command bundle for execution by at least one hardware architecture.

FIG. 6 is a flow diagram of an example method for modifying a command bundle for execution by at least one hardware architecture in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments. In one embodiment, a compiler may perform method 600 to provide a command bundle to one or more hardware architectures or platforms for execution thereof.

In addition, method 600 may be implemented using a command-aware hardware architecture that includes a plurality of routing nodes. Each routing node is associated with one or more hardware modules. Each hardware module is configured to process a certain type of command dependent on the individual hardware module (e.g., different command types may be processed by the different hardware modules in the command-aware hardware architecture).

In operation 602, the compiler receives a command bundle definition for execution by at least one hardware architecture. The command bundle definition may be received from a requesting process, such as an application, other system, etc. The command bundle definition may be a rudimentary, incomplete, or incompatible command bundle for execution by one of several available hardware architectures.

In operation 604, the compiler selects a hardware architecture, from amongst a group of hardware architectures, for execution of at least a portion of the command bundle definition. The selected hardware architecture may include a command-aware hardware architecture, in one embodiment.

In various approaches, the compiler selects the hardware architecture based on minimum hardware functionality needed to execute the command bundle definition, availability of the various hardware architectures (e.g., the selected hardware architecture is available to process commands), capability/functionality corresponding respectively to each of the plurality of hardware architectures, processing efficiency of the selected hardware architecture in light of the command bundle definition to be executed, etc.

In one embodiment, the compiler selects the hardware architecture based on additional factors, such as throughput of the hardware functions corresponding respectively to each of the plurality of hardware architectures, interface(s) available for hardware functions within each of the plurality of hardware architectures, space or area needed for implementing each of the plurality of hardware architectures, power consumption for each of the plurality of hardware architectures, resource cost for using each of the plurality of hardware architectures, time needed to process a command bundle for each of the plurality of hardware architectures, etc.

In operation 606, the compiler determines an ordered set of hardware functions corresponding to the selected hardware architecture. In other words, the compiler determines the order of function execution and capability/functionality for the selected hardware architecture.

In operation 608, the compiler modifies the command bundle definition to add commands, remove commands, and/or set an order for the set of logically independent commands. This modification may be based on any of the following: an order of the hardware functions in the ordered set of hardware functions, one or more command types executable by each of the hardware functions in the ordered set of hardware functions, data and argument requirements of the hardware functions in the ordered set of hardware functions, a determination of whether the selected hardware architecture comprises a parallel path, a determination of whether the selected hardware architecture comprises a load balancer, and a determination of whether the selected hardware architecture comprises a recirculation loop.

In operation 610, the compiler transmits the modified command bundle to the selected hardware architecture. In an alternate or complimentary embodiment, the compiler may store the modified command bundle for use at an appropriate future time (or for repeated use).

In one approach, a command bundle may be modified by the compiler in response to changes in hardware functionality of the selected hardware architecture. For example, a revision to hardware functionality of a command-aware hardware architecture may be implemented, and this revision may change how the command-aware hardware architecture processes commands or a command bundle (e.g., addition of a command type, removal of a command type, change in order of command execution capability, load balancer policy changes, etc.). Each new revision to the command-aware hardware architecture may trigger the compiler to modify a command bundle for execution by the command-aware hardware architecture. The revisions to the command-aware hardware architecture may be implemented by a system that does not include the compiler, in some approaches.

Variations of the disclosed embodiments are also possible, and the explicit description thereof in this document is not required in order to provide a person having ordinary skill in the art with the ability to conceive of such variations when reading the present descriptions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

4. MISCELLANEOUS; EXTENSIONS

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. HARDWARE OVERVIEW

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, FPGAs, or NPUs with custom programming to accomplish the techniques. The special-purpose computing devices may be desktop computer systems, portable computer systems, handheld devices, datacenter servers, networking devices or any other device that incorporates hard-wired and/or program logic to implement the techniques.

Figure 7:
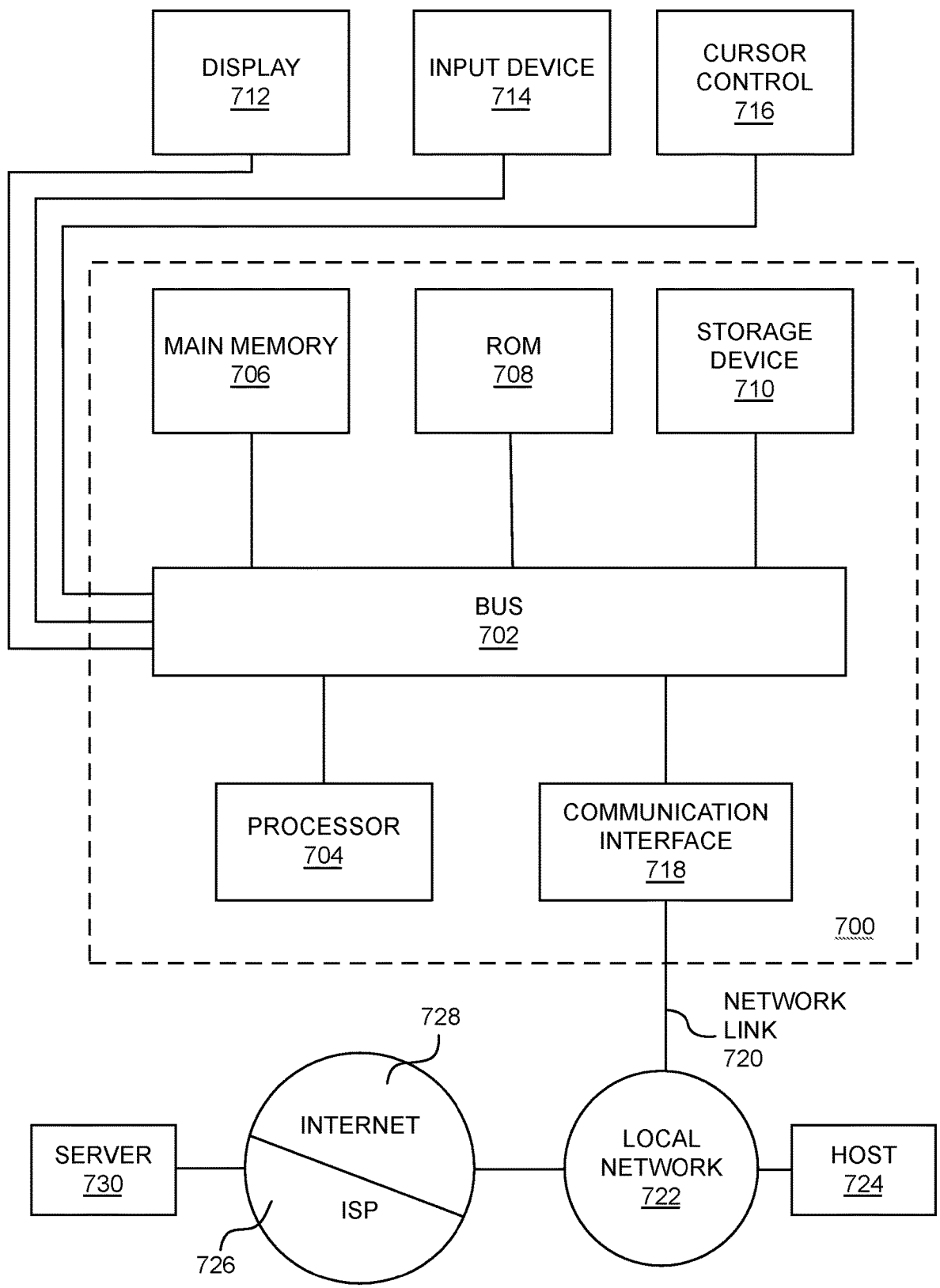
FIG. 7 shows a block diagram of an example computing system that may implement the features and processes of FIGS. 1-6.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or solid state disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or in addition, the computer system 700 may receive user input via a cursor control 716, such as a mouse, a trackball, a trackpad, a touchscreen, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. The display 712 may be configured to receive user input via one or more pressure-sensitive sensors, multi-touch sensors, and/or gesture sensors. Alternatively or in addition, the computer system 700 may receive user input via a microphone, video camera, and/or some other kind of user input device (not shown).

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, solid-state or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 700 can receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

What is claimed is:

1. A non-transitory computer readable medium comprising a set of instructions, which when executed by a hardware processor, causes the hardware processor to perform a method comprising:
  receiving an execution definition comprising one or more operations;
  determining an ordered set of hardware functions corresponding to a first hardware architecture to execute at least one operation of the one or more operations;
  identifying a set of logically independent commands to perform the at least one operation;
  ordering the set of logically independent commands based on an order for hardware functions in the ordered set of hardware functions corresponding to the first hardware architecture;
  generating, based on the ordered set of hardware functions, a command bundle comprising the ordered set of logically independent commands for execution by the first hardware architecture to perform the at least one operation; and
  transmitting the command bundle to the first hardware architecture.

2. The non-transitory computer readable medium of claim 1, wherein ordering the set of logically independent commands is further based on information selected from a group comprising:
  one or more command types executable by each of the hardware functions in the ordered set of hardware functions;
  data and argument requirements of the hardware functions in the ordered set of hardware functions;
  a determination of whether the first hardware architecture supports parallel processing;
  a determination of whether the first hardware architecture comprises a load balancer; and
  a determination of whether the first hardware architecture comprises a recirculation loop.

3. The non-transitory computer readable medium of claim 1, wherein generating the command bundle comprises selecting commands to include in the command bundle from a set of command types based on information selected from a group comprising:
  the at least one operation to be performed by the first hardware architecture;
  functionality corresponding to the ordered set of hardware functions; and
  functionality of one or more additional hardware architectures available to perform the at least one operation.

4. The non-transitory computer readable medium of claim 1, wherein generating the command bundle comprises:
  receiving a command bundle definition from a requesting process; and
  modifying the command bundle definition to set an order for the set of logically independent commands based on information selected from a group comprising:
    the order of hardware functions in the ordered set of hardware functions;
    one or more command types executable by each of the hardware functions in the ordered set of hardware functions;
    data and argument requirements of the hardware functions in the ordered set of hardware functions;
    a determination of whether the first hardware architecture supports parallel processing;
    a determination of whether the first hardware architecture comprises a load balancer; and
    a determination of whether the first hardware architecture comprises a recirculation loop.

5. The non-transitory computer readable medium of claim 1, wherein the method further comprises selecting the first hardware architecture from a plurality of hardware architectures available to execute operations based on:
  minimum hardware functionality needed to execute the at least one operation of the one or more operations; and
  functionality corresponding respectively to each of the plurality of hardware architectures.

6. The non-transitory computer readable medium of claim 5, wherein the method further comprises:
  selecting a second hardware architecture from the plurality of hardware architectures to perform a second operation of the one or more operations, the plurality of hardware architectures comprising: a field programmable gate array (FPGA), an application specific integrated circuit (ASIC), a graphics processing unit (GPU), and a central processing unit (CPU);
  determining a second set of hardware functions corresponding to the second hardware architecture;
  generating, based on the second set of hardware functions, a second command bundle comprising a second set of logically independent commands for execution by the second hardware architecture to perform the second operation, the second command bundle being compatible with the second hardware architecture; and
  transmitting the second command bundle to the second hardware architecture.

7. The non-transitory computer readable medium of claim 1,
  wherein the first hardware architecture comprises a plurality of routing nodes communicatively coupled to respective hardware modules, each hardware module being configured to execute one or more commands, and
  wherein determining the ordered set of hardware functions corresponding to the first hardware architecture comprises determining:
    a number of hardware modules in the first hardware architecture;
    one or more types of commands each hardware module is configured to execute;
    the order of hardware modules in the first hardware architecture;
    whether the first hardware architecture supports parallel processing; and
    whether the first hardware architecture comprises a recirculation loop.

8. The non-transitory computer readable medium of claim 7, wherein each routing node of the first hardware architecture is configured to:

receive the command bundle, wherein the command bundle is modified based on execution of the ordered set of logically independent commands as the command bundle is streamed through the plurality of routing nodes;

responsive to determining that (a) a first command of the ordered set of logically independent commands is not of a particular command type associated with at least one hardware module communicatively coupled to the routing node, or (b) at least one argument used for executing the first command is not received in association with the first command: transmit the first command to a second routing node of the plurality of routing nodes;

receiving a second command of the command bundle;

responsive to determining that (a) the second command of the ordered set of logically independent commands is of the particular command type associated with the at least one hardware module communicatively coupled to the routing node, and (b) arguments used by the second command are received in association with the second command: transmit the second command to the at least one hardware module communicatively coupled to the routing node for execution; and modify the command bundle based on execution of the second command by refraining from transmitting the second command of the command bundle to the second routing node.

9. The non-transitory computer readable medium of claim 1, wherein generating the command bundle comprises including a request for acknowledgement of execution of a particular command of the ordered set of logically independent commands.

10. The non-transitory computer readable medium of claim 1, wherein the method further comprises:

generating a dependent command bundle comprising a second set of commands for execution by the first hardware architecture or a second hardware architecture, execution of the dependent command bundle being contingent upon execution of the command bundle by the first hardware architecture; and transmitting the dependent command bundle to the first hardware architecture or the second hardware architecture.

11. The non-transitory computer readable medium of claim 10, wherein the method further comprises:

monitoring execution of the command bundle by the first hardware architecture; and determining that execution of the command bundle is complete, wherein the dependent command bundle is transmitted to the first hardware architecture or the second hardware architecture in response to determining that execution of the command bundle is complete.

12. A method, comprising:

receiving an execution definition comprising one or more operations;

determining an ordered set of hardware functions corresponding to a first hardware architecture to execute at least one operation of the one or more operations;

identifying a set of logically independent commands to perform the at least one operation;

ordering the set of logically independent commands based on an order for hardware functions in the ordered set of hardware functions corresponding to the first hardware architecture;

generating, based on the ordered set of hardware functions, a command bundle comprising the ordered set of logically independent commands for execution by the first hardware architecture to perform the at least one operation; and transmitting the command bundle to the first hardware architecture, wherein the method is performed by at least one device including a hardware processor.

13. The method of claim 12, wherein ordering the set of logically independent commands is further based on information selected from a group comprising:

one or more command types executable by each of the hardware functions in the ordered set of hardware functions;

data and argument requirements of the hardware functions in the ordered set of hardware functions;

a determination of whether the first hardware architecture supports parallel processing;

a determination of whether the first hardware architecture comprises a load balancer; and a determination of whether the first hardware architecture comprises a recirculation loop.

14. The method of claim 12, wherein generating the command bundle comprises selecting commands to include in the command bundle from a set of command types based on information selected from a group comprising:

the at least one operation to be performed by the first hardware architecture;

functionality corresponding to the ordered set of hardware functions; and functionality of one or more additional hardware architectures available to perform the at least one operation.

15. The method of claim 12, wherein generating the command bundle comprises:

receiving a command bundle definition from a requesting process; and modifying the command bundle definition to set an order for the set of logically independent commands based on information selected from a group comprising:

the order of hardware functions in the ordered set of hardware functions;

one or more command types executable by each of the hardware functions in the ordered set of hardware functions;

data and argument requirements of the hardware functions in the ordered set of hardware functions;

a determination of whether the first hardware architecture supports parallel processing;

a determination of whether the first hardware architecture comprises a load balancer; and a determination of whether the first hardware architecture comprises a recirculation loop.

16. The method of claim 12, further comprising:

selecting the first hardware architecture from a plurality of hardware architectures available to execute operations based on:

minimum hardware functionality needed to execute the at least one operation of the one or more operations; and functionality corresponding respectively to each of the plurality of hardware architectures;

selecting a second hardware architecture from the plurality of hardware architectures to perform a second operation of the one or more operations, the plurality of hardware architectures comprising: a field programmable gate array (FPGA), an application specific integrated circuit (ASIC), a graphics processing unit (GPU), and a central processing unit (CPU);

determining a second set of hardware functions corresponding to the second hardware architecture;

generating, based on the second set of hardware functions, a second command bundle comprising a second set of logically independent commands for execution by the second hardware architecture to perform the second operation, the second command bundle being compatible with the second hardware architecture; and transmitting the second command bundle to the second hardware architecture.

17. The method of claim 12, wherein the first hardware architecture comprises a plurality of routing nodes communicatively coupled to respective hardware modules, each hardware module being configured to execute one or more commands, and wherein determining the ordered set of hardware functions corresponding to the first hardware architecture comprises determining:
- a number of hardware modules in the first hardware architecture;
- one or more types of commands each hardware module is configured to execute;
- the order of hardware modules in the first hardware architecture;
- whether the first hardware architecture supports parallel processing; and
- whether the first hardware architecture comprises a recirculation loop, wherein each routing node of the first hardware architecture is configured to:
- receive the command bundle, wherein the command bundle is modified based on execution of the ordered set of logically independent commands as the command bundle is streamed through the plurality of routing nodes;
- responsive to determining that (a) a first command of the ordered set of logically independent commands is not of a particular command type associated with at least one hardware module communicatively coupled to the routing node, or (b) at least one argument used for executing the first command is not received in association with the first command: transmit the first command to a second routing node of the plurality of routing nodes;
- receiving a second command of the command bundle;
- responsive to determining that (a) the second command of the ordered set of logically independent commands is of the particular command type associated with the at least one hardware module communicatively coupled to the routing node, and (b) arguments used by the second command are received in association with the second command: transmit the second command to the at least one hardware module communicatively coupled to the routing node for execution; and
- modify the command bundle based on execution of the second command by refraining from transmitting the second command of the command bundle to the second routing node.

18. The method of claim 12, wherein generating the command bundle comprises including a request for acknowledgement of execution of a particular command of the ordered set of logically independent commands.

19. The method of claim 12, wherein the method further comprises:
- generating a dependent command bundle comprising a second set of commands for execution by the first hardware architecture or a second hardware architecture, execution of the dependent command bundle being contingent upon execution of the command bundle by the first hardware architecture;
- transmitting the dependent command bundle to the first hardware architecture or the second hardware architecture;
- monitoring execution of the command bundle by the first hardware architecture; and
- determining that execution of the command bundle is complete, wherein the dependent command bundle is transmitted to the first hardware architecture or the second hardware architecture in response to determining that execution of the command bundle is complete.

20. A command-aware hardware architecture, comprising:
- hardware logic configured to receive an execution definition comprising one or more operations;
- hardware logic configured to determine an ordered set of hardware functions corresponding to a first hardware architecture to execute at least one operation of the one or more operations;
- hardware logic configured to identify a set of logically independent commands to perform the at least one operation;
- hardware logic configured to order the set of logically independent commands based on an order for hardware functions in the ordered set of hardware functions corresponding to the first hardware architecture;
- hardware logic configured to generate, based on the ordered set of hardware functions, a command bundle comprising the ordered set of logically independent commands for execution by the first hardware architecture to perform the at least one operation; and
- hardware logic configured to transmit the command bundle to the first hardware architecture.

* * * * *